INVENTOR
ROBERT I. SATTLER

ABSTRACT OF THE DISCLOSURE

Machine tool apparatus in which a cutting tool is mounted on a movable support for movement in one direction toward the work to be machined. A stop assembly capable of determining the work position of the tool is also mounted on the movable support for adjustable movement back and forth in the direction of cutting tool travel. This enables adjustment of the stop assembly to a desired position in which the cutting tool and replacements therefor are maintained in a pre-established position relative to the work.

---

This invention relates generally to machine tools and more particularly to apparatus which maintains tooling in a preestablished position after tool change. This application is a division of copendnig application Ser. No. 356,794 filed Apr. 2, 1964, now abandoned.

In some machine tool situations, the space available for the tool holder is very limited and it has therefore been impossible to set the tooling in the desired position without making several adjustments to the machine every time a tool is changed. Each adjustment of the machine requires a trial cut, and checking of the results of the cut are often difficult. It is therefore desirable to be able to preset a cutting tool off the machine and then put the tool into the machine with no adjustment to the machine, to thus reduce machine down time to a minimum during tool change and thereby increase machine efficiency. The principal object of this invention, therefore, is to provide improved preset tool apparatus which is usable to maintain a tool and replacements therefor, including the original tool after grinding and sharpening, in a preestablished position relative to the work.

A further object of this invention is to provide preset tool apparatus of the above-described type which is relatively simple to install and use and is versatile in operation in an automated machine tool assembly.

The apparatus of this invention includes an adjustable positive stop which is mounted on the machine so that it can readily be removed and installed. When the tool on the machine is to be changed, the adjustable positive stop is removed from the machine and preset with the tool which is now to be mounted on the machine in a tool setting gauge. The adjustable positive stop is then reinstalled in the machine in a known position determined by the setting gauge, and the tool is installed in the machine. The adjustable positive stop will then locate the tool in a preestablished desired work position in which the tool completes its assigned work operation.

Figure 1:
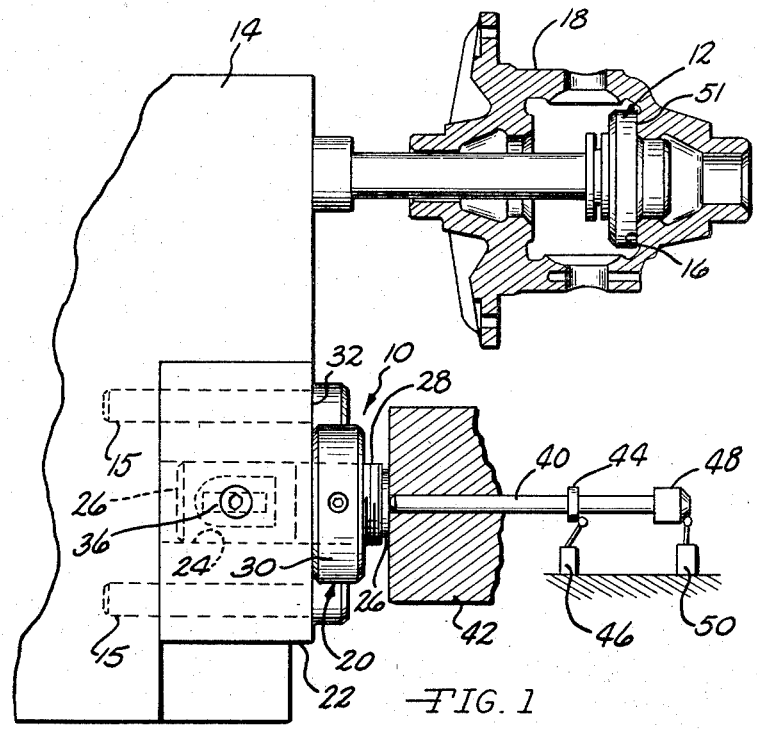
Figure 2:
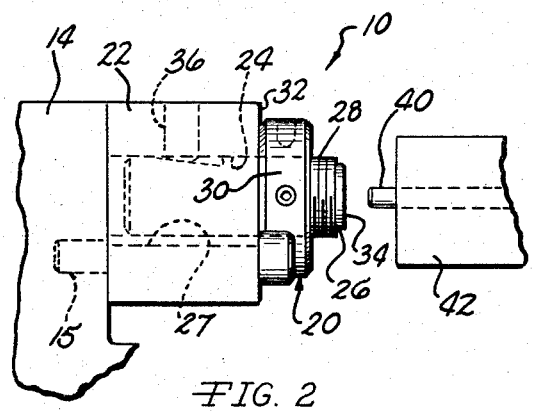

Further objects, features and advantages of this invention will become apparent from a consideration of the following description, the appended claims, and the accompanying drawing in which:

FIGURE 1 is a fragmentary plan view of a portion of a machine showing a cutting tool and the adjustable positive stop of this invention in assembly relation thereon, and illustrating an operative position of the stop with respect to a tool control bar; and FIGURE 2 is a fragmentary elevational view of the structure shown in FIG. 1.

With reference to the drawing, the preset tool apparatus of this invention, indicated generally at 10, is illustrated in FIG. 1 in assembly relation with a cutting tool 12 mounted on a movable machine tool head 14 which is operable to move the tool 12 in and out relative to a face 16 which is to be machined on a workpiece 18. An adjustable positive stop assembly 20 is mounted on the head 14 so that it is in a particular relationship with respect to the tool 12.

The adjustable positive stop assembly 20 includes a body 22 secured to the head 14, such as by bolts 15, and provided with a very accurately ground opening 24. A stop member 26 is slidably supported in the opening 24 and is maintained against turning therein by a key 27. An outer end portion 28 of the member 26 is threaded and a nut 30 is threadably supported thereon and engaged with the end surface 32 of the body 22. As a result, the nut 30 is rotatable to adjust the position of the end 34 of the stop member 26. A set screw 36 is mounted on the body 22 so that it can be tightened against the stop member 26 to maintain it in an adjusted position. Thus, the nut 30 and the set screw 36 cooperate to provide for micro adjustment of the stop member 26 and holding of the stop member 26 in an adjusted position.

The stop member 26 is illustrated in FIG. 1 aligned with a switch actuating rod 40 slidably mounted in a block 42. The rod 40 carries an actuating block 44 for a depth switch 46 and a similar block 48 for a feed switch 50. The switches 46 and 50 control the operation of the cutting tool 12. Thus, by maintaining the end 34 of the adjustable positive stop member 26 in a preestablished relation with the working face 51 on the tool 12, the desired relationship of the working face 51 and the workpiece face 16 to provide for a precisely located machined face 16 is maintained.

This is accomplished, when a tool change is to be made, by removing the assembly 20 from its support 14 when a tool 12 is removed for grinding and sharpening or other replacement. The replacement tool 12 and the assembly 20 are set up in a gauge to determine the necessary adjustment of the positive stop 26 to maintain the tool face 51 at a desired position. Both the adjustable positive stop 26 and the tool replacement are then readily remounted on the support 14 and the machine tool is ready for reuse. Consequently, a minimum of machine down time is involved in tool changes.

It will be understood that the preset tool apparatus which is herein disclosed and described is presented for purposes of explanation and illustration and is not intended to indicate limits of the invention, the scope of which is defined by the following claim.

What is claimed is:

1. In machine tool apparatus which includes a movable support and a cutting tool mounted on said support and having a working face adapted to be moved in one direction to a work position, a stop assembly capable of determining the work position of said face, said stop assembly comprising a stop member, said stop member being slidably mounted on said support for adjustable movement in said one direction and a direction opposite thereto, and coacting means on said support and said stop member maintaining the stop member in an adjusted position, said coacting means including nut means threadably mounted on said stop member and engaged with said support and set screw means on said support engaged with said stop member.

References Cited

UNITED STATES PATENTS

| | | |
|---|---|---|
| 599,275 | 2/1898 | Webb. |
| 1,757,929 | 5/1930 | Shaw et al. _____ 33—185 X |
| 2,148,348 | 2/1939 | Groene et al. |
| 2,369,642 | 2/1945 | Benning. |
| 3,067,521 | 12/1962 | Platt _____ 33—185 |

WILLIAM D. MARTIN, JR., *Primary Examiner.*